(12) United States Patent
Tamura et al.

(10) Patent No.: US 11,259,539 B2
(45) Date of Patent: Mar. 1, 2022

(54) METHOD FOR PRODUCING CHEESE-FLAVORED SUBSTANCE

(71) Applicant: MEIJI CO., LTD., Tokyo (JP)

(72) Inventors: Kazuji Tamura, Tokyo (JP); Junya Ishida, Tokyo (JP); Motofumi Takahashi, Tokyo (JP); Nobutaka Yahiro, Tokyo (JP)

(73) Assignee: MEIJI CO., LTD., Tokyo (JP)

( * ) Notice: Subject to any disclaimer, the term of this patent is extended or adjusted under 35 U.S.C. 154(b) by 184 days.

(21) Appl. No.: 16/617,564

(22) PCT Filed: May 31, 2018

(86) PCT No.: PCT/JP2018/020951
§ 371 (c)(1),
(2) Date: Nov. 27, 2019

(87) PCT Pub. No.: WO2018/221651
PCT Pub. Date: Dec. 6, 2018

(65) Prior Publication Data
US 2020/0163355 A1 May 28, 2020

(30) Foreign Application Priority Data
Jun. 1, 2017 (JP) .............................. JP2017-109325

(51) Int. Cl.
*A23C 20/00* (2006.01)

(52) U.S. Cl.
CPC ........... *A23C 20/00* (2013.01); *A23Y 2220/23* (2013.01); *A23Y 2220/39* (2013.01); *A23Y 2220/49* (2013.01); *A23Y 2220/63* (2013.01)

(58) Field of Classification Search
CPC ................ A23C 20/00; A23Y 2220/23; A23Y 2220/39; A23Y 2220/49; A23Y 2220/63
USPC .......................................................... 426/39
See application file for complete search history.

(56) References Cited

U.S. PATENT DOCUMENTS

| | | | |
|---|---|---|---|
| 4,707,364 A * | 11/1987 | Barach | A23C 19/043 425/35 |
| 4,708,876 A | 11/1987 | Yokoyama et al. | |
| 2007/0110848 A1 | 5/2007 | Koka et al. | |

FOREIGN PATENT DOCUMENTS

| | | | | |
|---|---|---|---|---|
| JP | 49-16619 | | 4/1974 | |
| JP | 49-16619 B1 * | | 4/1974 | |
| JP | 61-242542 | | 10/1986 | |
| JP | 2007-135592 | | 6/2007 | |
| JP | 2007-527213 | | 9/2007 | |
| JP | 2009-296972 | | 12/2009 | |
| JP | 2012-502026 | | 1/2012 | |
| JP | 2013-503604 | | 2/2013 | |
| JP | 2014-125446 | | 7/2014 | |
| JP | 2014125446 A * | | 7/2014 | ........... A23C 19/032 |
| JP | 2016-93198 | | 5/2016 | |
| WO | 2005/002361 | | 1/2005 | |
| WO | 2009/041210 | | 4/2009 | |
| WO | WO-2009041210 A1 * | | 4/2009 | ........... A23C 19/061 |
| WO | WO-2010027344 A1 * | | 3/2010 | ............. A61P 13/08 |
| WO | 2011/026863 | | 3/2011 | |

OTHER PUBLICATIONS

International Preliminary Report On Patentability dated Dec. 12, 2019 in International (PCT) Application No. PCT/JP2018/020951.
International Search Report (ISR) dated Aug. 28, 2018 in International (PCT) Application No. PCT/JP2018/020951.

* cited by examiner

*Primary Examiner* — Brent T O'Hern
(74) *Attorney, Agent, or Firm* — Wenderoth, Lind & Ponack, L.L.P.

(57) ABSTRACT

The present invention relates to a method for producing a cheese-flavored substance, including adding a bacterial cell disrupted product obtained by disrupting lactic acid bacteria and an enzyme to a milk raw material to cause a reaction. The present invention can provide a method for producing a cheese-flavored substance which can safely and efficiently produce a cheese-flavored substance having a more natural cheese flavor at low-cost with simple operation.

4 Claims, No Drawings

METHOD FOR PRODUCING CHEESE-FLAVORED SUBSTANCE

CROSS-REFERENCE TO RELATED APPLICATIONS

This application claims benefit of priority of Japanese Patent Application No. 2017-109325 (filed on Jun. 1, 2017), which is incorporated herein by reference in its entirety.

BACKGROUND OF THE INVENTION

Technical Field

The present invention relates to a method for producing a cheese-flavored substance. Particularly, the present invention relates to a method for producing a cheese-flavored substance having a natural cheese flavor.

Related Art

Generally, substances called "analog cheese", "imitation cheese", and "enzyme-treated cheese (EMC)" are used as alternative substances for cheese.

Analog cheese or imitation cheese is a food substance having a cheese-like flavor and physical properties even though almost no cheese is used as a raw material. Further, EMC is a substance in which the cheese flavor is greatly enhanced by adding lactic acid bacteria, proteases, and lipases to cheese as a raw material to cause a reaction, and it is also used as a raw material for analog cheese or imitation cheese.

As described above, various analog cheeses, imitation cheeses, and EMCs, which have an enhanced cheese flavor, have been studied. However, there is still a demand for a substance having better cheese flavor.

The cheese is thought to have a complex flavor due to the fact that lactic acid bacteria gradually die out during long-term aging of cheese and intracellular enzymes of the lactic acid bacteria are eluted.

It is known that a cheese-flavored substance can be obtained by adding lactic acid bacteria to or performing an enzyme treatment on cheese or a milk raw material.

However, these substances have an artificial flavor, and the flavor deviates from the natural cheese flavor.

For example, JP 2007-527213 A (Patent Document 1) describes a method for preparing a cheese-like product using a lactase-producing microorganism and lactic acid bacteria (e.g., claims of this literature).

JP 2009-296972 A (Patent Document 2) describes enzyme-treated cheese obtained by reacting an enzyme produced by *Lactobacillus helveticus* with cheese (e.g., claims of this literature).

JP 2013-503604 A (Patent Document 3) describes that, in a method for producing a dairy product using lactic acid bacteria, the dairy product contains cheese, and an enzyme is used before fermentation (e.g., claims of this literature).

However, these literatures neither describe nor suggest that lactic acid bacteria are used after disruption of bacterial cells.

As a technique for using lactic acid bacteria after disruption of bacterial cells, a technique has been reported in which lactic acid bacteria are mechanically disrupted and the lactic acid bacteria after disruption of bacterial cells are used for the production of natural cheese (JP 2016-093198 A (Patent Document 4)). However, the technique disclosed herein only relates to the production of natural cheese.

RELATED DOCUMENT LIST

Patent Documents

Patent Document 1: Japanese Patent Application Laid-Open Publication No. 2007-527213 A (WO2005/002361)
Patent Document 2: Japanese Patent Application Laid-Open Publication No. 2009-296972 A
Patent Document 3: Japanese Patent Application Laid-Open Publication No. 2013-503604 A (WO2011/026863)
Patent Document 4: Japanese Patent Application Laid-Open Publication No. 2016-093198 A

SUMMARY OF THE INVENTION

The present inventors have recently disrupted bacterial cells of lactic acid bacteria to be used by addition of acid, added the resulting bacterial cell disrupted product to a milk raw material together with enzymes such as protease, peptidase, and lipase to cause a reaction. They have succeeded in obtaining a cheese-flavored substance having a flavor closer to natural cheese than the conventional flavor substance. The present inventors have also examined the case of using bacterial cell disrupted products obtained by a salt treatment and an alkali treatment instead of a bacterial cell disrupted product obtained by an acid treatment. Similarly, they have succeeded in obtaining the cheese-flavored substance. It has been unexpected that the flavor of the cheese-flavored substance could be improved to a more natural cheese flavor by using a bacterial cell disrupted product efficiently obtained with a simple operation such as addition of acid, salt or alkali.

The present invention is based on these findings.

Therefore, an object of the present invention is to provide a method producing a cheese-flavored substance having a natural cheese flavor which includes reacting lactic acid bacteria after disruption of bacterial cells by a simple method and an enzyme with a milk raw material such as cheese.

That is, according to the present invention, the following inventions are provided:

<1> A method for producing a cheese-flavored substance, including adding a bacterial cell disrupted product obtained by disrupting lactic acid bacteria and an enzyme to a milk raw material to react them.

<2> The method according to <1>, including disrupting lactic acid bacteria with an acid, an alkali or a salt to obtain a bacterial cell disrupted product.

<3> The method according to <1> or <2>, including disrupting lactic acid bacteria by adding an acid to obtain a bacterial cell disrupted product.

<4> The method according to any one of <1> to <3>, where the enzyme is one or more selected from the group consisting of protease, peptidase, and lipase.

<5> The method according to any one of <1> to <4>, where the milk raw material is one or more selected from the group consisting of cheese, butter, cream, and nonfat dry milk.

Advantageous Effects of Invention

According to the method of the present invention, bacterial cells are disrupted with a simple operation without large-scale equipment installation, and extracellular enzymes of lactic acid bacteria can be efficiently eluted, whereby a more natural cheese flavor can be imparted to the cheese-flavored substance. As in the present invention, in the case of using a bacterial cell disrupted product which has been disrupted by an acid or the like, it is possible to realize the flavor close to that of a good natural cheese that is equal to or better than the case of using a mechanically disrupted product of bacterial cells. As far as the present inventors know, there is no example of a method for producing a cheese-flavored substance which uses the bacterial cell disrupted product obtained by a simple method such as the acid treatment.

Therefore, according to the present invention, it is possible to safely and efficiently produce a cheese-flavored substance having a more natural cheese flavor at low-cost with simple operation. In the cheese-flavored substance obtained by the present invention, a flavor-improving effect has been observed such that the flavor complexity increases, leading to a more natural cheese flavor.

MODE FOR CARRYING OUT THE INVENTION

Hereinafter, embodiments of the present invention will be described.

As described above, the method for producing a cheese-flavored substance in the present invention includes adding a bacterial cell disrupted product obtained by disrupting lactic acid bacteria and an enzyme to a milk raw material to cause a reaction.

The "cheese-flavored substance" used herein means a substance having a cheese flavor that can be used as an alternative substance for cheese, similarly to analog cheese, imitation cheese or enzyme-treated cheese (EMC).

In the method for the present invention, lactic acid bacteria are disrupted to obtain a bacterial cell disrupted product. The lactic acid bacteria that can be used herein are not particularly limited, and specific examples thereof include lactic acid bacteria such as genus *Lactococcus*, genus *Lactobacillus*, genus *Streptococcus*, genus *Leuconostoc*, genus *Propionibacterium*, and genus *Bifidobacterium*. More specific examples thereof include *Lactococcus lactis* subsp. *lactis*, *L. lactis* subsp. *lactis biovar diacetilactis*, *L. lactis* subsp. *cremoris*, *Lactobacillus helveticus*, *L. helveticus* subsp. *jugurti*, *L. delbrueckii* subsp. *bulgaricus*, *L. delbrueckii* subsp. *lactis*, *L. acidophilus*, *L. crispatus*, *L. amylovorus*, *L. gallinarum*, *L. gasseri*, *L. johnsonii*, *L. casei*, *L. paracasei*, *L. casei* subsp. *rhamnosus*, *Streptococcus salivarius* subsp. *thermophilus*, *Leuconostoc cremoris*, *Leu. lactis*, *Leu. mesenteroides* subsp. *mesenteroides*, *Leu. mesenteroides* subsp. *dextranicum*, *Leu. parames enteroides*, *Propionibacterium shermani*, *Bifidobacterium bifidum*, *B. longum*, *B. breve*. *B. infantis*, and *B. adolescentis*. At this time, these lactic acid bacteria may be used singly, or in combination of two or more kinds thereof.

In the present invention, the lactic acid bacteria are preferably cultured in advance prior to disruption of bacterial cells, if necessary, and the amount of the bacterial cells is appropriately increased and used. Further, lactic acid bacteria concentrated by one or more of a membrane separation method, a centrifugal separation method, and a vacuum evaporation method can be used. Further, lactic acid bacteria dried by any one of a freeze-drying method, a reduced-pressure spray-drying method, and a spray-drying method may be used. Furthermore, lactic acid bacteria that have been subjected to neutralization culture may be used.

The number of lactic acid bacteria per unit volume is increased by the membrane separation method, the centrifugal separation method, the vacuum evaporation method, the freeze-drying method, the reduced-pressure spray-drying method, the spray-drying method, the neutralization culture method or the like, so that it is possible to adjust the concentration of lactic acid bacteria to a high value using the lactic acid bacteria culture.

In the present invention, there is no particular limitation on the method for disrupting lactic acid bacteria to obtain a bacterial cell disrupted product, as long as it can disrupt or destroy cell walls and cell membranes of bacterial cells. The method may be a mechanical (physical) disruption method or may be a non-mechanical disruption method. In the mechanical disruption method, for example, a ball mill, a bead mill, a homogenizer (a homogeneous machine) or an ultrasonic device can be used, and these devices may be devices for dry pulverization or wet pulverization.

In the present invention, the method for disrupting lactic acid bacteria to obtain a bacterial cell disrupted product is preferably a non-mechanical method, particularly a disruption method using an acid, an alkali or a salt. According to these methods, the bacterial cells can be disrupted with a simple operation without large-scale equipment installation, and a good and natural cheese flavor can be realized in the obtained cheese-flavored substance. Among them, the method using an acid is more preferable.

According to a more preferred aspect of the present invention, the method for disrupting lactic acid bacteria to obtain a bacterial cell disrupted product is a method for disrupting lactic acid bacteria by adding an acid to obtain a bacterial cell disrupted product.

In a case where lactic acid bacteria are disrupted using an acid to obtain a bacterial cell disrupted product, the usable acid is not particularly limited as long as it can be used in food applications such as cheese-flavored substances. For example, citric acid, phosphoric acid, malic acid, succinic acid, fumaric acid, lactic acid or acetic acid can be used. Preferably, the acid is citric acid or phosphoric acid.

In the case of using an acid, the acid is added to lactic acid bacteria and, if necessary, neutralized with sodium hydroxide or the like. Then, the resultant is used as a bacterial cell disrupted product by the acid. Here, when the acid is added to the lactic acid bacteria, it is preferable that the pH of the solution containing the lactic acid bacteria be once adjusted to a range of 2.5 to 3.8, preferably about a range of 3.0 to 3.5, and then neutralized. At this time, the reaction temperature is preferably between 10° C. and 50° C., and more preferably between 20° C. and 40° C.

In a case where lactic acid bacteria are disrupted using an alkali to obtain a bacterial cell disrupted product, the usable alkali is not particularly limited as long as it can be used in food applications as cheese-flavored substances. For example, sodium hydroxide, potassium hydroxide, potassium carbonate, calcium hydroxide, trisodium phosphate or sodium pyrophosphate can be used. The alkali is preferably sodium hydroxide or trisodium phosphate.

In the case of using an alkali, the alkali is added to lactic acid bacteria and, if necessary, neutralized with citric acid or the like. Then, the resultant is used as a bacterial cell disrupted product by the alkali. Here, when the alkali is added to the lactic acid bacteria, it is preferable that the pH of the solution containing the lactic acid bacteria be once adjusted to a range of 9.0 to 10.5, preferably about a range of 9.7 to 10.3, and then neutralized.

In a case where lactic acid bacteria are disrupted using a salt to obtain a bacterial cell disrupted product, the usable salt is not particularly limited as long as it can be used in food applications. For example, sodium chloride, potassium chloride, sodium lactate, monosodium phosphate, disodium phosphate or the like can be used. The salt is preferably sodium chloride or potassium chloride.

In the method for producing a cheese-flavored substance of the present invention, a bacterial cell disrupted product obtained by disrupting lactic acid bacteria and an enzyme is added to a milk raw material to cause a reaction.

Here, it is preferable that the survival rate of the bacterial cell disrupted product be reduced to less than 50% as compared with that before disruption. When the survival rate is 50% or more, sufficient bacteria are still alive and the disruption is not sufficient. Thus, the effects of the present invention are hardly obtained. Further, it is preferable that the additive amount of the bacterial cell disrupted product be in a range of 0.1% to 5% with respect to the milk raw material to be added.

The enzyme that can be used in the present invention is not particularly limited as long as it is an enzyme that is usually involved in a general cheese fermentation process or an enzyme that can exist during fermentation. Animal-derived, plant-derived, and microorganism-derived enzymes usable for food processing can be used as long as the enzymes act on proteins and lipids. In the present invention, the microorganism-derived enzyme is preferable. Specific examples of the enzyme that can be used include protease, peptidase, lipase, and aminopeptidase. According to a preferred aspect of the present invention, the enzyme is one or more selected from the group consisting of protease, peptidase, and lipase, and more preferably a combination of protease, peptidase, and lipase.

Preferably, the amount of the enzyme to be used herein is, for example, in a range of about 0.001% to 0.3% with respect to the milk raw material to be added.

Examples of the milk raw material that can be used in the present invention include cheese-making milk, cheese curd, cheese food, natural cheese, processed cheese, raw milk, defatted milk, nonfat dry milk, whole powdered milk, concentrated milk, concentrated skim milk, ingredient-adjusted milk, fresh cream, and butter. The milk raw material is preferably cheese, butter, cream or nonfat dry milk, and more preferably cheese curd, fresh cream or butter. These milk raw materials may be used in combination of two or more kinds thereof.

In the present invention, a bacterial cell disrupted product and an enzyme are added to a milk raw material to cause a reaction. That is, the bacterial cell disrupted product and the enzyme are added to the milk raw material and stirred appropriately. Then, the resulting mixture is maintained at a predetermined temperature for a predetermined time to cause a reaction. The reaction temperature can be appropriately adjusted depending on the kind of enzyme to be used and the ratio of volume of the enzyme to the milk raw material. Further, the reaction time can be appropriately adjusted depending on the amount of the bacterial cell disrupted product, the kind of enzyme to be used, and the ratio of volume of the enzyme to the milk raw material, or can be appropriately adjusted depending on the desired strength of cheese flavor. Examples of the reaction temperature and reaction time include conditions of reacting at 20° C. to 50° C. for 8 hours to 7 days. Preferably, the reaction temperature is from 25° C. to 40° C. and the reaction time is from 12 hours to 4 days.

According to another aspect of the present invention, there is provided a cheese-flavored substance produced by the method of the present invention.

According to still another aspect of the present invention, there is provided a cheese-flavored food product that uses the cheese-flavored substance produced by the method of the present invention. Furthermore, there is provided a method for producing a cheese-flavored food product, including adding the cheese-flavored substance to a food material to produce the cheese-flavored food product.

EXAMPLES

Hereinafter, the present invention will be described in detail with reference to the following Examples, but the present invention is not limited thereto.

Example 1: Production of Cheese-Flavored Substance (Disruption of Lactic Acid Bacteria by Acid)

(1) Preparation of Lactic Acid Bacteria to be Disrupted 200 g of a medium containing 10% nonfat dry milk and 0.1% yeast extract was prepared, and the resulting medium was pasteurized by heating at 95° C. for 60 minutes.

Then, 0.4 g of a medium temperature lactic acid bacteria starter (frozen product) was aseptically added to the medium and maintained at 27° C. for 18 hours.

The lactic acid bacteria starter used here included four kinds of lactic acid bacteria: *Lactococcus lactis* subsp. *lactis*; *Lactococcus lactis* subsp. *cremoris*; *Lactobacillus paracasei*; and *Lactobacillus helveticus*.

(2a) Disruption of Lactic Acid Bacteria (Acid Disruption)

Citric acid was added to the maintained culture medium which had been obtained in (1) in order to adjust the pH of the medium to 3.3 and the resulting mixture was maintained at 37° C. for 1 hour.

Then, sodium hydroxide was added to the mixture in order to adjust the pH to 5.0. This mixture was used as a disrupted lactic acid bacteria solution (bacterial cell disrupted product by the acid). At this time, when the number of viable bacteria was measured before and after disruption of bacterial cells by the acid, the survival rate of the bacteria was 37.5%.

(3a) Preparation of Milk Raw Material (Milk Raw Material/Cheese)

372 g of water was added to 1009 g of Gouda cheese, the mixture was well suspended, 5.4 g of filamentous bacteria-derived protease was added to the suspension and stirred at 36° C. for 4 hours.

Thereafter, the resulting mixture was pasteurized by heating at 63° C. for 30 minutes, and then cooled to 36° C.

This mixture was used as the milk raw material (pre-processed cheese).

(4a) Enzyme Treatment and Lactic Acid Bacteria Fermentation

The following components:
(i) 170 g of the disrupted lactic acid bacteria solution obtained in (2a) as described above (bacterial cell disrupted product by the acid);
(ii) 16.9 g of sodium chloride; and
(iii) two kinds of filamentous bacteria-derived proteases (7.6 g in total), 2.3 g of filamentous bacteria-derived peptidase, 0.04 g of yeast-derived lipase, and 0.17 g of filamentous bacteria-derived lipase were added to the milk raw material obtained in (3a) as described above, and the mixture was stirred at 36° C. for 3 days.

Then, 1400 g of the obtained suspension was collected and heated to 65° C. 96 g of sodium caseinate, 3.2 g of xanthan gum, and 70 g of water were added to the suspension, and then the mixture was heated to 85° C. for pasteurization.

The resulting mixture was homogenized with a homogenizer at 15 MPa for 5 minutes.

Thereafter, the homogenized mixture was filled in a container and cooled, and the resultant was designated as a cheese-flavored substance 1 (Example 1).

Examples 2 to 4: Production of Cheese-Flavored Substance (Disruption of Lactic Acid Bacteria by Salt, Alkali, and Mechanical Disruption)

A sample of a cheese-flavored substance 2 (Example 2, salt disruption), a sample of a cheese-flavored substance 3 (Example 3, alkali disruption), and a sample of a cheese-flavored substance 4 (Example 4, mechanical disruption) were prepared in a similar manner to Example 1 except that the acid disruption of Example 1 (2a), the salt disruption (2b), alkali disruption (2c) or mechanical disruption (2d) as described later were performed.

(2b) Disruption of Lactic Acid Bacteria (Salt Disruption)

60 g of the maintained culture medium which had been obtained in (1) of Example 1 was prepared, 12 g of sodium chloride was added thereto, and maintained at 37° C. for 1 hour.

This mixture was used as a disrupted lactic acid bacteria solution (bacterial cell disrupted product by the salt). At this time, when the number of viable bacteria was measured before and after disruption of bacterial cells by the salt, the survival rate of the bacteria was 41.7%.

(2c) Disruption of Lactic Acid Bacteria (Alkali Disruption)

200 g of the maintained culture medium which had been obtained in (1) of Example 1 was prepared, a sodium hydroxide solution (25 w/v %) was added thereto so as to have a pH of 10.0, and maintained at 37° C. for 1 hour.

Then, citric acid was added to the mixture in order to adjust the pH to 5.0. This mixture was used as a disrupted lactic acid bacteria solution (bacterial cell disrupted product by the alkali). At this time, when the number of viable bacteria was measured before and after disruption of bacterial cells by the alkali, the survival rate of the bacteria was 37.5%.

(2d) Disruption of Lactic Acid Bacteria (Mechanical Disruption (Homoaenization Disruption))

200 g of the maintained culture medium which had been obtained in (1) of Example 1 was prepared and homogenized at 1200 bar using a homogenizer (PANDA2K, manufactured by Niro Soavi).

This mixture was used as a disrupted lactic acid bacteria solution (bacterial cell disrupted product by mechanical disruption). At this time, when the number of viable bacteria was measured before and after disruption of bacterial cells by mechanical disruption, the survival rate of the bacteria was 25.0%.

Examples 5 and 6: Production of Cheese-Flavored Substance (Use of Fresh Cream and Butter as Milk Raw Materials)

A sample of a cheese-flavored substance 5 (Example 5, milk raw material/fresh cream) and a sample of a cheese-flavored substance 6 (Example 6, milk raw material/butter) were prepared in a similar manner to Example 1 except that "fresh cream" prepared in (3b) or "butter" prepared in (3c) (both described later) was used as the milk raw material instead of the "cheese" prepared in Example 1 (3a), and "(4b) enzyme treatment and lactic acid bacteria fermentation" as described later were performed instead of "(4a) enzyme treatment and lactic acid bacteria fermentation" of Example 1.

(3b) Preparation of Milk Raw Material (Milk Raw Material/Fresh Cream)

600 g of water was added to 400 g of nonfat dry milk, the mixture was well suspended, 570 g of fresh cream having a fat content of 47% was added thereto and stirred well.

Thereafter, the resulting mixture was pasteurized by heating at 63° C. for 30 minutes, and then cooled to 36° C.

This mixture was used as the milk raw material (fresh cream).

(3c) Preparation of Milk Raw Material (Milk Raw Material/Butter)

873 g of water was added to 400 g of nonfat dry milk, the mixture was well suspended, 327 g of salt-free butter melt by heat was added thereto and stirred well.

Thereafter, the resulting mixture was pasteurized by heating at 63° C. for 30 minutes, and then cooled to 36° C.

This mixture was used as the milk raw material (butter).

(4b) Enzyme Treatment and Lactic Acid Bacteria Fermentation

The following components:

(i) 170 g of the disrupted lactic acid bacteria solution obtained in (2a) as described above (bacterial cell disrupted product by the acid);

(ii) 16.9 g of sodium chloride; and (iii) 2.2 g of one kind of filamentous bacteria-derived protease, 0.04 g of yeast-derived lipase, and 0.17 g of filamentous bacteria-derived lipase were added to the milk raw material obtained in (3b) or (3c) as described above, and the mixture was stirred at 36° C. for 3 days.

Then, 1400 g of the obtained suspension was collected and heated to 65° C. 96 g of sodium caseinate and 3.2 g of xanthan gum were added to the suspension, and then the mixture was heated to 85° C. for sterilization.

The resulting mixture was homogenized with a homogenizer at 15 MPa for 5 minutes.

Thereafter, the homogenized mixture was filled in a container and cooled, and the resultant was designated as a cheese-flavored substance 5 or 6 (Example 5 or 6).

Comparative Example: Production of Cheese-Flavored Substance (Without Disruption)

A sample of a cheese-flavored substance (Comparative example, without disruption) was prepared in a similar manner to Example 1 except that the acid disruption (2) of Example 1 was not performed.

Evaluation Test

The following flavor evaluation tests were performed on the cheese-flavored substances 1 to 6 of Examples 1 to 6 obtained above.

Evaluation Method 200 mL of milk was heated in a pan, and white sauce (manufactured by Kewpie Corporation, canned, 245 g per can) was added in small portions while mixing so as not to form lumps. Then, the mixture was thoroughly mixed at a temperature at which it did not boil and divided into portions. 3% of each of the flavored substances of Examples 1 to 4 was added to the portions and mixed. After that, these portions were refrigerated (4° C.) and returned to room temperature (23° C.) at the time of evaluation.

Evaluation Criteria

As for the evaluation items, three items: "natural cheese-like flavor"; "complex aroma"; and "total taste" were evaluated by 10 independent evaluators. The evaluation was based on a score of −3 (weak feeling or no feeling) to +3 (strong feeling).

A comprehensive evaluation (A (excellent), B (normal), C (slightly inferior)) was performed based on each of these evaluation items.

The results are shown in the following table.

TABLE 1

| | Cheese-flavored substance | | | | | | |
|---|---|---|---|---|---|---|---|
| | Comparative Example | 1 | 2 | 3 | 4 | 5 | 6 |
| (Disruption of lactic acid bacteria) | No disruption | Acid disruption | Salt disruption | Alkali disruption | Mechanical disruption | Acid disruption | Acid disruption |
| (Milk raw material) | Cheese | Cheese | Cheese | Cheese | Cheese | Fresh cream | Butter |
| Natural cheese-like flavor | 0 | 0.9 | −0.1 | 0.0 | 1.1 | 0.8 | 0.8 |
| Complex aroma | 0 | 0.8 | 0.0 | −0.2 | 0.9 | 0.8 | 0.7 |
| Total taste | 0 | 1.2 | 0.2 | 0.3 | 1.1 | 1.0 | 1.1 |
| Comprehensive evaluation | C | A | B | B | A | A | A |

The invention claimed is:

1. A method for producing a cheese-flavored substance, comprising the steps of:
providing a bacterial cell disrupted product which is obtained by disrupting lactic acid bacteria with an acid which is selected from the group consisting of citric acid, phosphoric acid, malic acid, succinic acid, fumaric acid, lactic acid, and acetic acid, and
adding the bacterial cell disrupted product and an enzyme to a milk raw material to cause a reaction.

2. The method according to claim 1, wherein the enzyme is one or more selected from the group consisting of protease, peptidase, and lipase.

3. The method according to claim 1, wherein the milk raw material is one or more selected from the group consisting of cheese, butter, cream, and nonfat dry milk.

4. The method according to claim 1, wherein the acid is citric acid or phosphoric acid.

* * * * *